H. BARTON.
Dumping-Wagon.
No. 58,575. Patented Oct. 9, 1866.
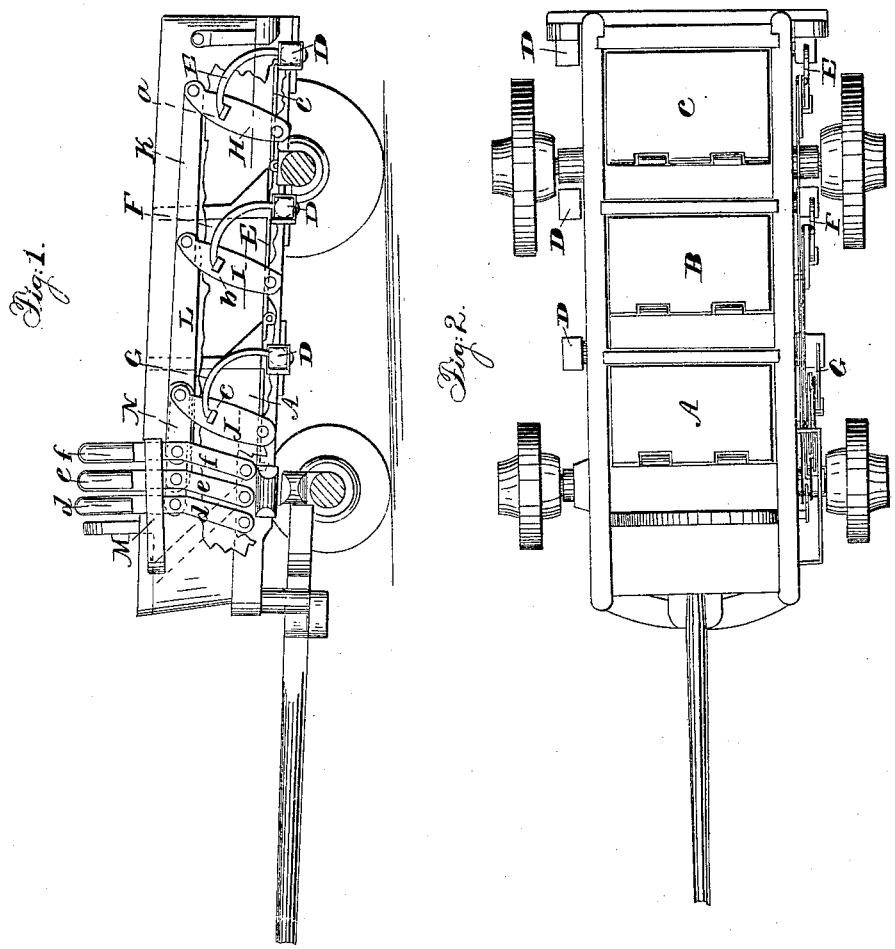

UNITED STATES PATENT OFFICE.

HARVEY BARTON, OF BLACK EARTH, WISCONSIN.

IMPROVEMENT IN DUMPING-WAGONS.

Specification forming part of Letters Patent No. 58,575, dated October 9, 1866.

*To all whom it may concern:*

Be it known that I, HARVEY BARTON, of Black Earth, in the county of Dane and State of Wisconsin, have invented a new and Improved Self-Unloading Wagon; and I do hereby declare that the following is a full, clear, and exact description thereof, which will enable others skilled in the art to make and use the same, reference being had to the accompanying drawings, forming part of this specification, in which—

Figure 1 is a side elevation of my wagon-box with parts broken away to expose its interior. Fig. 2 is a plan or top view of the same wagon.

Similar letters of reference indicate like parts.

This improved wagon is intended for farmers' use for hauling dirt, for venders of different kinds of articles, such as vegetables, &c., and for all uses where it is desirable to keep different articles from each other, as well as to produce a quick means for unloading the wagon.

The invention consists in constructing the bottom of the wagon of a series of drops held up by shoulders cut upon a rock-shaft and operated by levers arranged upon the side of the wagon, and accessible to the driver, for liberating pawls, which hold up the rock-shaft, whereby all or any one of the drops may allow the contents of any particular compartment of the wagon to be deposited quickly.

The wagon is of the usual form, and is mounted upon four wheels, the hind axle being secured directly to the under side of the box, and the front axle turning on a pivot working in a transverse beam on the under side of the front part of the box.

The bottom of the wagon in the present instance is composed of three drops, A B C, each hinged to a transverse piece and arranged to fall downward when opened. D D D are rock-shafts, one being arranged under and in front of each drop A B C, and each so constructed that when turned in one direction it will project under the front of the drop and keep it up, but when turned in another will clear the drop, so as to let it fall.

To the end of each rock-shaft there is secured a pawl, E F G, whose ends bear upon lugs *a b c* upon plates H I J. These plates H I J each have one of their ends pivoted to the side of the wagon, as shown in Fig. 1, and pivoted respectively to rods or springs K L N. To the ends of the springs K L N nearest the driver's seat are pivoted levers *d e f*, whose lower ends are pivoted to the side of the wagon-box, and which are held at their upper end in a guide, M.

The operation is as follows: To dump or deposit the contents of the rear compartment of the wagon, the lever *d* is thrown forward. This draws the lug *a* on the plate H away from under the pawl E, and thus releases the rock-shaft, so that it will fall or rock over, one side being heavier than the other, and this allows the drop C to fall. The same operation applies to the other drops.

The convenience afforded by a wagon thus constructed will be great to farmers who desire to carry to market, separate from each other, different articles of produce, such as potatoes, apples, or vegetables, and so that the same can be quickly deposited, and the convenience it affords to a person engaged in hauling dirt, stones, &c., who is thereby enabled to deposit his load without leaving his seat, is apparent.

What I claim as new, and desire to secure by Letters Patent, is—

The combination of the drop A B C, rock-shafts D, pawls E F G, plates H I J, levers *d e f*, and springs K L N, substantially as shown and described.

HARVEY BARTON.

Witnesses:
MORE SPEARS,
E. C. MOWER.